Patented Apr. 6, 1937

2,075,801

UNITED STATES PATENT OFFICE 2,075,801

METHOD OF NITRIFYING SUPERPHOSPHATE

Harry A. Curtis, Knoxville, Tenn., assignor to Tennessee Valley Authority, Wilson Dam, Ala., a corporation of United States No Drawing. Application August 23, 1935, Serial No. 37,533

4 Claims. (Cl. 71—29)

(Granted under the act of March 3, 1883, as amended April 30, 1928; 370 O. G. 757)

This application is made under the act of April 30, 1928, and the invention herein described, if patented, may be manufactured and used by or for the Government for governmental purposes without the payment to me of any royalty thereon.

This invention relates to fertilizer nitrifying compositions and particularly those suitable for the production of nitrogenous phosphatic fertilizers.

One of the objects of this invention is to provide an improved superphosphate nitrifying agent in liquid form. Another object of this invention is to provide a fertilizer nitrifying composition which contains both inorganic and organic nitrogen. Still another object of this invention is to provide a fertilizer nitrifying composition, in which the constituent which contains the organic nitrogen is derived from an economical source not heretofore made extensively available for fertilizer use. Another object of this invention is to provide a fertilizer nitrifying composition for the production of fertilizers containing a substantial proportion of water soluble organic nitrogen. Other objects of this invention include the provision for a fertilizer nitrifying composition which carries a constituent having a high percentage of organic nitrogen.

I have produced a new and improved fertilizer nitrifying composition comprised of a liquid containing free ammonia and free guanidine or a guanidine salt of a mineral acid.

One example for the production of the improved fertilizer nitrifying composition which lies within the scope of this invention is given as follows: A nitrifying composition, in which the ratio of inorganic nitrogen to organic nitrogen is 1 to 1, is produced by absorbing ammonia vapor, in an aqueous solution of crude guanidine, containing 39 to 40% by weight of the free base, until the resulting solution contains 23% by weight of ammonia and 27% by weight of guanidine.

A second example for the production of the improved fertilizer nitrifying composition is given below: A nitrifying composition, in which the ratio of inorganic nitrogen to organic nitrogen is 5 to 1, is produced by absorbing ammonia vapor in an aqueous solution of crude guanidine phosphate, containing 20 to 21% by weight of tri-guanidine phosphate and an excess of free ammonia, until the resulting solution contains 37% by weight of ammonia and 13% by weight of tri-guanidine phosphate.

A third example for the production of the improved fertilizer nitrifying composition follows: A slurry of crude calcium cyanamide, ammonium sulfate and aqueous ammonia is autoclaved to produce a mixture containing a solution of 11.5% by weight of guanidine sulfate and free ammonia, in which is suspended calcium sulfate. This mixture is used to absorb ammonia gas until the resulting nitrifying composition contains 40% by weight of free ammonia and 10% by weight of di-guanidine sulfate.

It is evident that there are numerous factors which will influence conditions for the most satisfactory production and use of the compositions covered by this invention, the actual limits of which cannot be established except by detailed study of each set of raw materials and finished products involved. Aqueous or anhydrous liquid ammonia may be used as long as it produces a proper finished fertilizer mixture but it is preferred to use the guanidine in the form of the phosphate or the sulfate. The guanidine used may be in the form of the pure base or salt, but it is more economical to use the crude or partially purified base or salt. The crude base or salt may be partially purified if it contains any substantial proportion of fixed nitrogen associated therewith which may be considered to have undesirable properties. The nitrifying solution which contains 40 to 50% by weight of nitrogen compounds in solution has been found preferable, although the concentrations used may vary beyond these limits, depending upon the superphosphate to be treated, whether the guanidine base or a guanidine salt is used in the nitrifying composition, and the ratio of the inorganic to organic nitrogen to be incorporated. The fertilizer nitrifying compositions contemplated within the scope of this invention may be used for the treatment of superphosphates resulting from any method involving the production of materials used for ammoniation with aqueous or anhydrous ammonia and other nitrifying compositions.

It will be seen, therefore, that this invention actually may be carried out by the modification of certain details without departing from its spirit or scope.

I claim:

1. Process of nitrifying a superphosphate fertilizer, which comprises, treating the superphosphate with a nitrifying agent comprising, free ammonia, guanidine phosphate, and water.

2. Process of nitrifying a superphosphate fertilizer, which comprises, treating the superphosphate with a nitrifying agent comprising, free ammonia, a guanidine salt, and water.

3. Process of nitrifying a superphosphate fertilizer, which comprises, treating the superphosphate with a nitrifying agent comprising, free ammonia, and guanidine phosphate.

4. Process of nitrifying a superphosphate fertilizer, which comprises, treating the superphosphate with a nitrifying agent comprising, free ammonia, and a guanidine salt.

HARRY A. CURTIS.